United States Patent
Salmimaa et al.

(10) Patent No.: US 12,517,691 B2
(45) Date of Patent: Jan. 6, 2026

(54) CONTROLLED DISPLAY OF CONTENT ACROSS MULTIPLE APPARATUSES

(71) Applicant: Nokia Technologies Oy, Espoo (FI)

(72) Inventors: Marja Pauliina Salmimaa, Tampere (FI); Toni Johan Järvenpää, Tampere (FI); Arto Juhani Lehtiniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/524,270

(22) Filed: Nov. 30, 2023

(65) Prior Publication Data
US 2024/0201926 A1 Jun. 20, 2024

(30) Foreign Application Priority Data
Dec. 19, 2022 (EP) .................................... 22214597

(51) Int. Cl.
 *G06F 3/14* (2006.01)
 *G06T 7/73* (2017.01)
(52) U.S. Cl.
 CPC .............. *G06F 3/1446* (2013.01); *G06T 7/73* (2017.01)
(58) Field of Classification Search
 CPC ...... G06F 3/1446; G06F 3/1423; G06F 3/012; G06F 3/0304; G06F 3/013; G06T 7/73; G02B 27/0093
 See application file for complete search history.

(56) References Cited

U.S. PATENT DOCUMENTS

| | | | |
|---|---|---|---|
| 10,960,297 B2* | 3/2021 | Chapman | G06F 3/017 |
| 2016/0261793 A1* | 9/2016 | Sivan | G06F 3/013 |
| 2017/0351471 A1* | 12/2017 | Passeri | G06F 3/033 |
| 2021/0240259 A1* | 8/2021 | Bull | G06F 3/013 |
| 2022/0308662 A1* | 9/2022 | Fan | H04N 13/239 |
| 2022/0413788 A1 | 12/2022 | Anderson | |

FOREIGN PATENT DOCUMENTS

| | | |
|---|---|---|
| EP | 3501375 A1 | 6/2019 |
| JP | 2019118548 A | 7/2019 |
| KR | 2017-0045101 A | 4/2017 |

OTHER PUBLICATIONS

"Bluetooth signals can be used to identify and track smartphones", ScienceDaily, Retrieved on Dec. 6, 2023, Webpage available at : https://www.sciencedaily.com/releases/2022/06/220608161407.htm.

"Your Smartphone's Selfie Cam Can See a Lot by Capturing Reflections in Your Pupils", Gizmodo, Retrieved on Dec. 6, 2023, Webpage available at : https://gizmodo.com/smartphones-selfie-cam-captures-info-from-reflections-i-1848859306.

(Continued)

*Primary Examiner* — Towfiq Elahi
(74) *Attorney, Agent, or Firm* — McCarter & English LLP

(57) ABSTRACT

An apparatus comprising:
 a camera for capturing at least an image;
 means for processing a sub-portion of the image to identify a plurality of reflections in a human eye;
 means for associating at least one second group of reflections to a second apparatus;
 means for controlling rendering of content on at least the second apparatus in dependence upon at least the second group of reflections.

20 Claims, 7 Drawing Sheets

(56) References Cited

OTHER PUBLICATIONS

"iPhone X: The hardware behind Face ID", ZDNET, Retrieved on Dec. 6, 2023, Webpage available at : https://www.zdnet.com/article/iphone-x-the-hardware-behind-face-id/.

"Google AI's Iris Software Tracks Eye Movement and Distance", Interesting Engineering, Retrieved on Dec. 6, 2023, Webpage available at : https://interestingengineering.com/innovation/google-ais-iris-software-tracks-eye-movement-and-distance.

Jenkins et al., "Identifiable Images of Bystanders Extracted from Corneal Reflections", PLOS One, vol. 8, No. 12, Dec. 2013, pp. 1-5.

Extended European Search Report received for corresponding European Patent Application No. 22214597.1, dated May 15, 2023, 10 pages.

* cited by examiner $a \cdot \tan \theta = b$

CONTROLLED DISPLAY OF CONTENT ACROSS MULTIPLE APPARATUSES

RELATED APPLICATION

This application claims priority to European Patent Application No. 22214597.1, filed Dec. 19, 2022, which is incorporated herein by reference in its entirety.

TECHNOLOGICAL FIELD

Examples of the disclosure relate to controlled display of content across multiple apparatuses.

BACKGROUND

It can be desirable to control display of content across multiple apparatuses.

For example, instead of using a single display to display content, multiple displays can be used to display the content.

One example is the use of multiple displays with a computer. The operating system desktop (the graphical user interface) can be extended across the multiple displays via operating system settings.

This works well when the displays have a fixed spatial (e.g. left-right) relationship.

However, problems can arise if the displays are moved, especially if the location and orientation of the displays can be arbitrarily changed.

BRIEF SUMMARY

One solution may be to accurately track the location and orientation of each display using positioning sensors such as location sensors, orientation sensors and inertial sensors. If the positions of the displays are known then content can be distributed in according to position across the displays. However, the use of sensor would add costs and they would need to be retrofitted to existing displays. Another problem that could arise, is that it is not known which displays are visible to a consumer of the content and which displays are not.

It would be desirable to have a solution that does not rely (or wholly rely) on sensors at the displays and can differentiate between displays that are visible to a human consumer of content and displays that are not visible to the human consumer of content.

According to various, but not necessarily all, examples there is provided an apparatus comprising:
 a camera for capturing at least an image;
 means for processing a sub-portion of the image to identify a plurality of reflections in a human eye;
 means for associating at least one second group of reflections to a second apparatus;
 means for controlling rendering of second content on at least the second apparatus in dependence upon at least the second group of reflections.

In some but not necessarily all examples, the means for controlling rendering of second content on at least the second apparatus in dependence upon at least the second group of reflections is configured to control at least content orientation at the second apparatus relative to the human eye in dependence upon at least the second group of reflections.

In some but not necessarily all examples, the means for associating at least one second group of reflections to a second apparatus is configured to associate the at least one second group of reflections to a light pattern provided by the second apparatus, wherein the light pattern is indicated to the apparatus or the second content is controlled by the apparatus.

In some but not necessarily all examples, the means for associating at least one second group of reflections to a second apparatus is configured to associate the at least one second group of reflections to the second content displayed by a display of the second apparatus, wherein the second content is indicated to the apparatus or the second content is controlled by the apparatus.

In some but not necessarily all examples, the apparatus comprises means for associating a first group of the plurality of reflections to the apparatus; and means for controlling rendering of second content on the second apparatus and first content on the apparatus, in dependence upon at least the first group of the plurality of reflections.

In some but not necessarily all examples, the means for associating the at least one first group of reflections to the apparatus is configured to:
 (i) associate the at least one first group of reflections to a light pattern provided by the apparatus, or
 (ii) associate the at least one first group of reflections to first content displayed by a display of the apparatus.

In some but not necessarily all examples, the apparatus comprises means for simultaneously controlling rendering of first content on a display of the apparatus and rendering of the second content on a display of the second apparatus, in dependence upon at least the second group of reflections In some but not necessarily all examples, the apparatus comprises means for automatic transfer of a content portion from a display of the apparatus to a display of the second apparatus or means for presenting a user selectable option to transfer a content portion from the display of the apparatus to the display of the second apparatus.

In some but not necessarily all examples, the apparatus comprises means for replacing the content transferred, in the display of the apparatus, with a simplified representation of the content transferred.

In some but not necessarily all examples, the means for controlling rendering of second content on at least the second apparatus in dependence upon at least the second group of reflections is configured to control at least an orientation of second content displayed at the second apparatus relative to an orientation of the apparatus.

In some but not necessarily all examples, the apparatus comprises:
 means for processing a first sub-portion of the image to identify a first plurality of reflections in a first eye of the human;
 means for associating at least one second group of the first plurality of reflections to a second apparatus;
 means for processing a second sub-portion of the image to identify a plurality of reflections in a second eye of the human;
 means for associating at least one second group of the second plurality of reflections to the second apparatus;
 means for controlling rendering of second content on at least the second apparatus in dependence upon at least the second group of the first plurality of reflections and the second group of the first plurality of reflections.

In some but not necessarily all examples, the apparatus is configured to operate in at least a master mode or a slave mode, wherein
 when the apparatus is in the master mode, the apparatus is configured to:

control rendering of the second content on at least the second apparatus in dependence upon at least the second group of reflections;

when the apparatus is in the slave mode, the apparatus is configured to:

render content on a display of the apparatus in dependence upon control from a different apparatus.

In some but not necessarily all examples, the apparatus is configured as a hand-held, mobile apparatus comprising a front display and a front camera.

According to various, but not necessarily all, examples there is provided a method comprising:

processing a sub-portion of a captured image to identify a plurality of reflections in a human eye;

associating at least one second group of reflections to a second apparatus; controlling rendering of second content on at least the second apparatus in dependence upon at least the second group of reflections.

According to various, but not necessarily all, examples there is provided a computer program comprising instructions that when executed by one or more processors causes:

processing a sub-portion of a captured image to identify a plurality of reflections in a human eye;

associating at least one second group of reflections to a second apparatus;

controlling rendering of second content on at least the second apparatus in dependence upon at least the second group of reflections.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
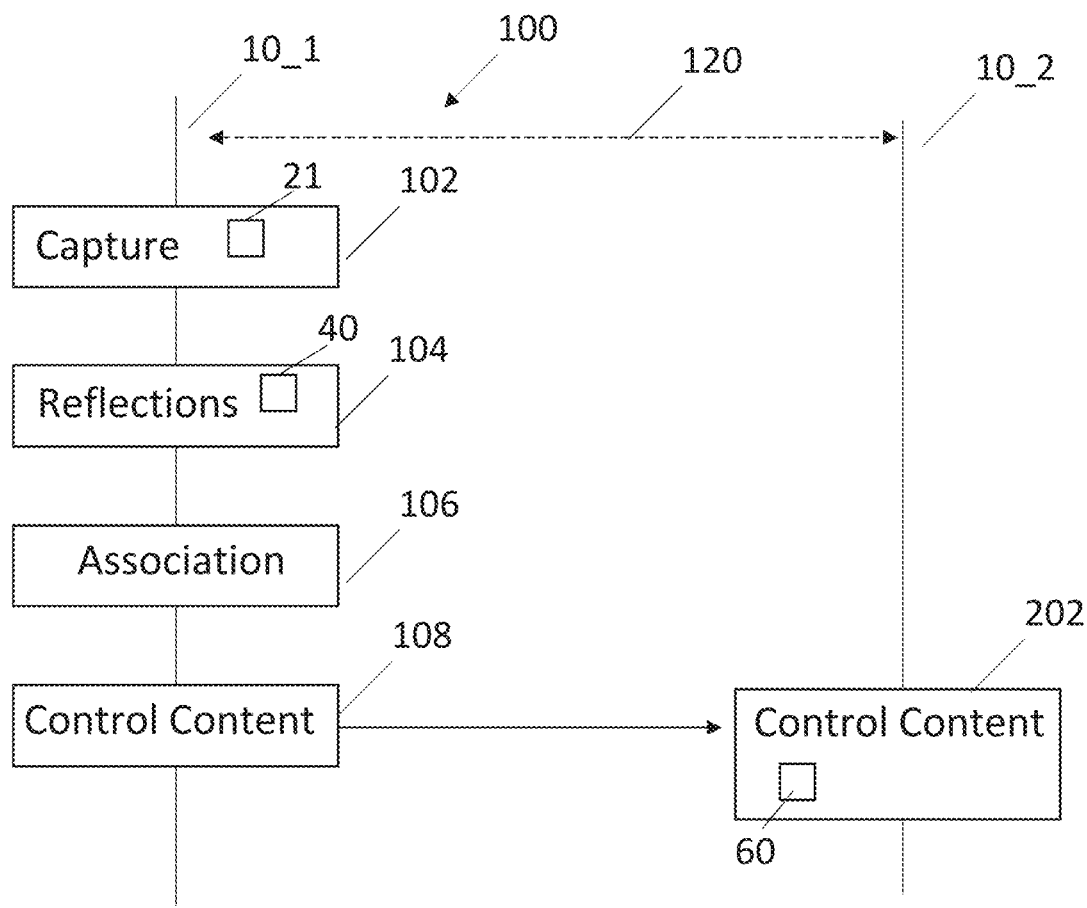
FIG. 1 illustrates an example of an apparatus 10_1 and an example of a method performed by the apparatus 10_1.
Figure 5A:
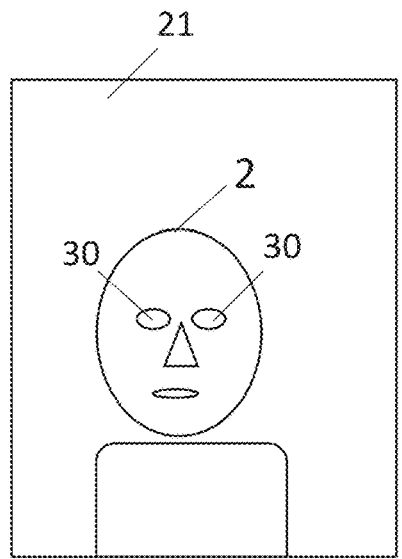
FIG. 5A illustrates an example of an image 21 captured by the apparatus 10_1.
Figure 5B:
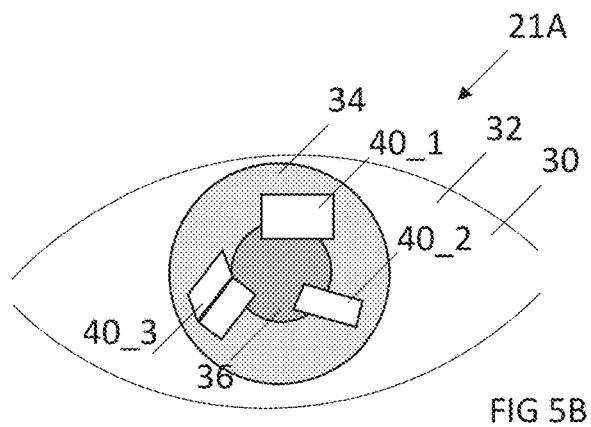
Figure 6A:
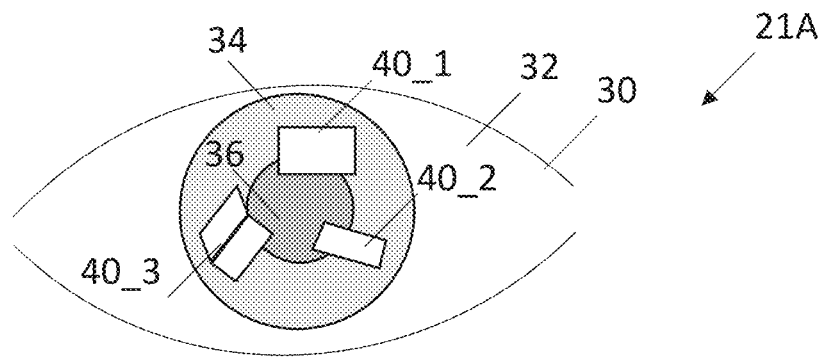
Figure 6B:
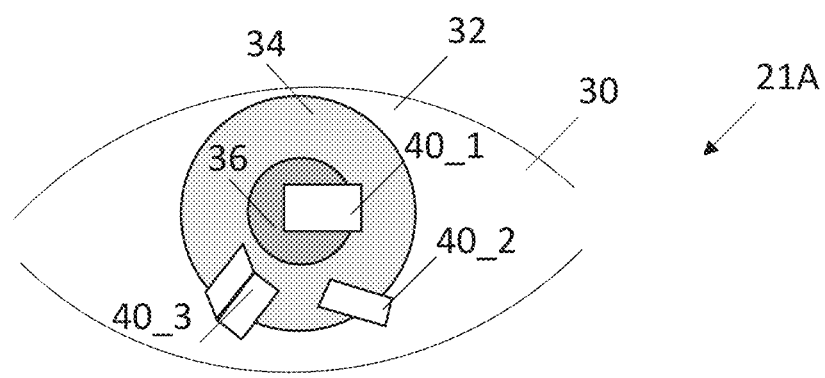
Figure 6C:
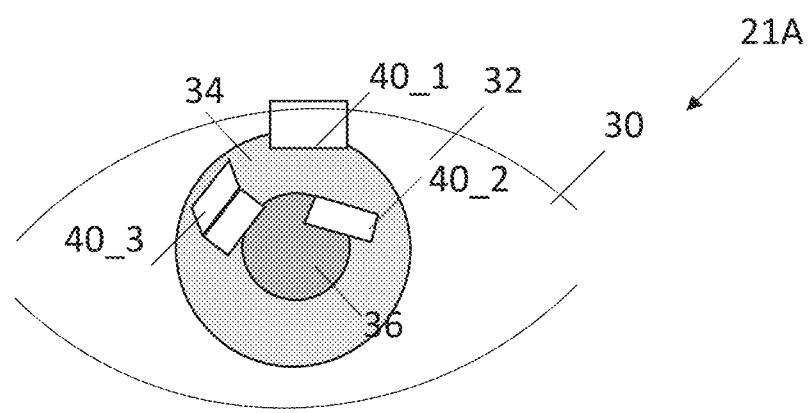
Figure 7:
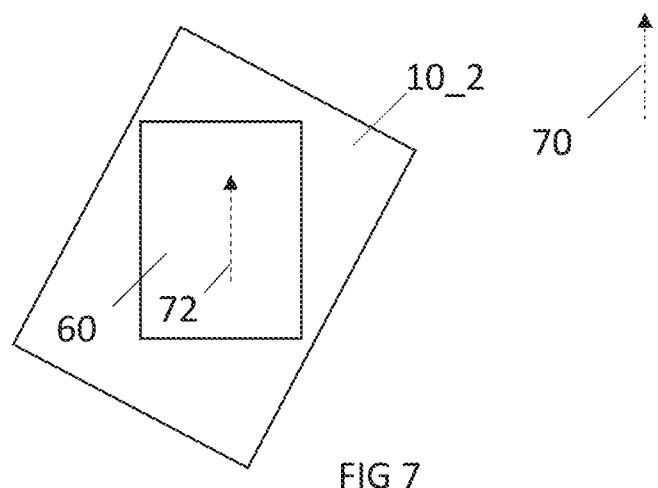
Figure 8A:
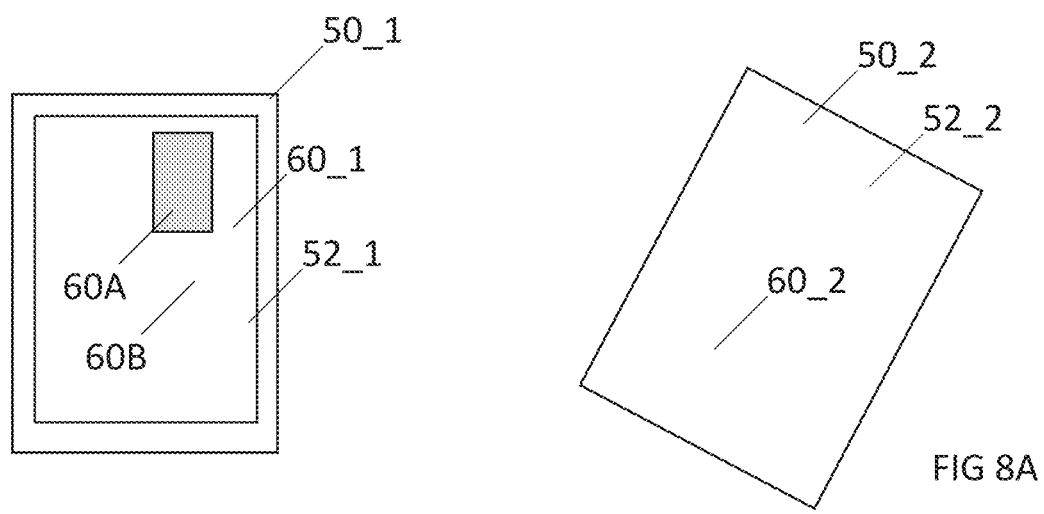
Figure 8B:
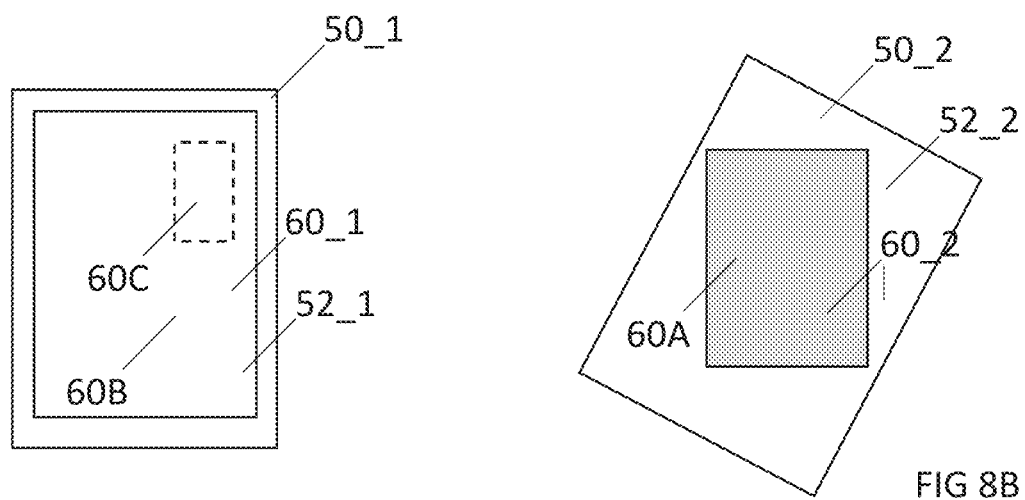
Figure 9:
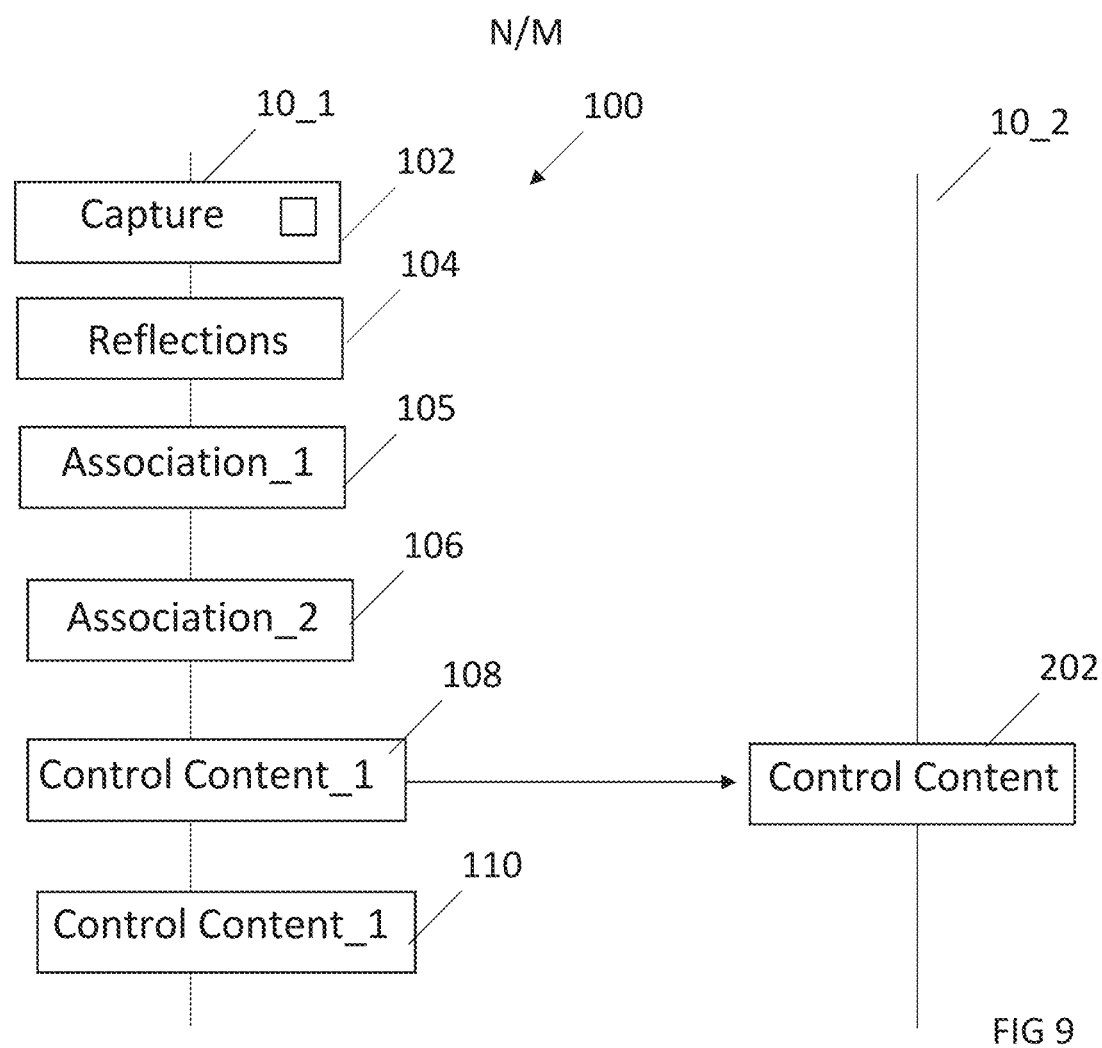
Figure 10:
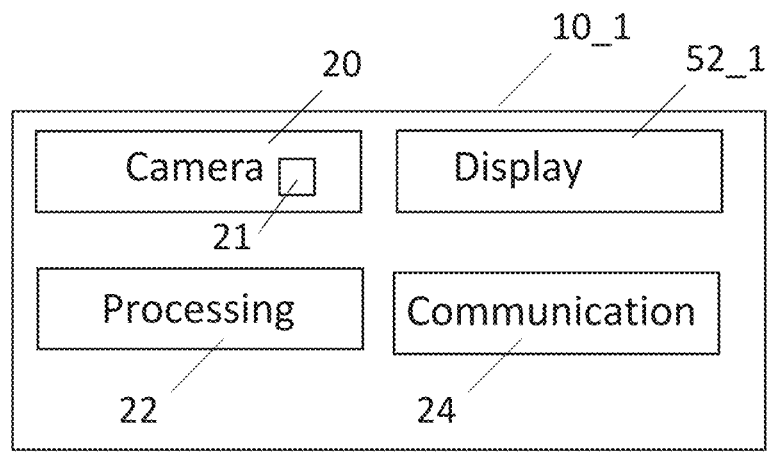
Figure 11A:
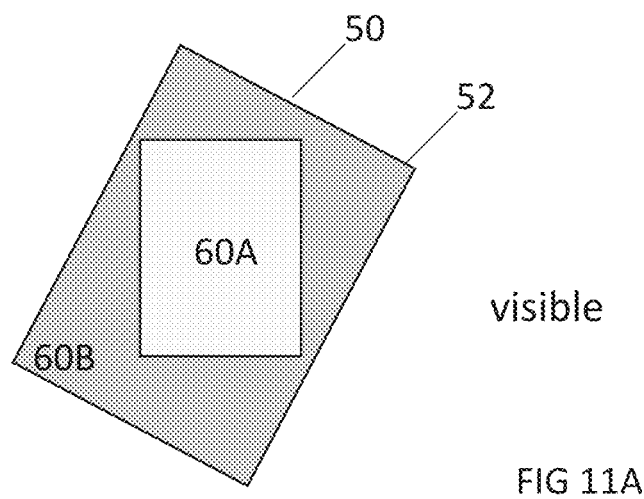
Figure 11B:
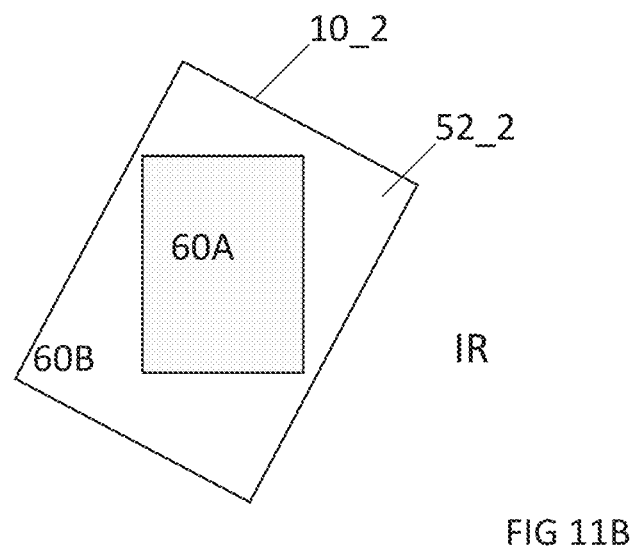
Figure 12A:
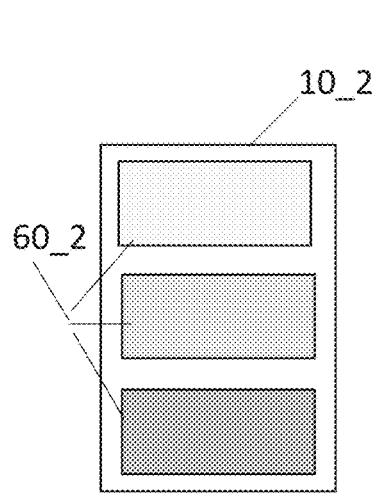
Figure 12B:
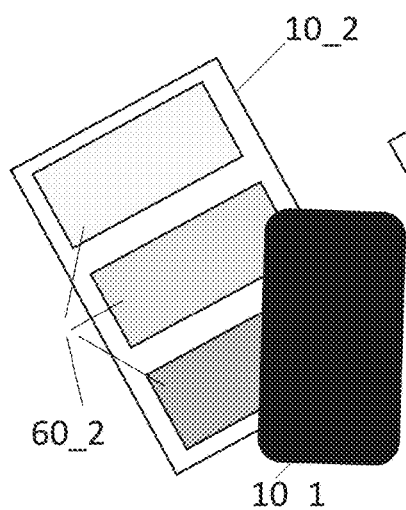
Figure 12C:
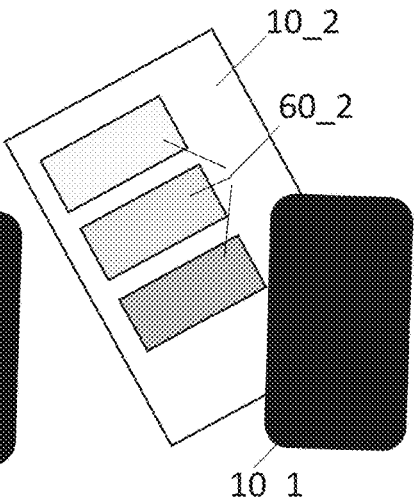
Figure 13:
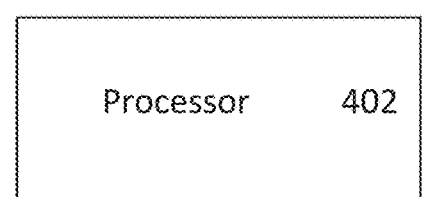
Figure 13:
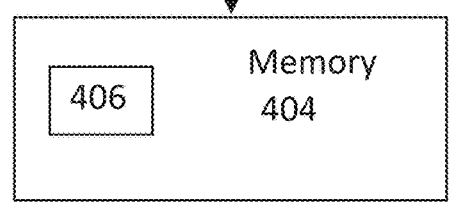
Figure 14:
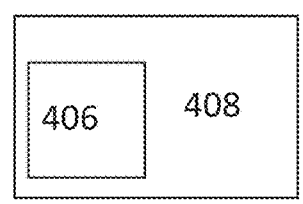

FIG. 5B illustrates an example of a sub-portion 21A of the image 21 captured by the apparatus 10_1 and illustrates a configuration of reflections 40 in the cornea 30 of the eye 30;

FIGS. 6A, 6B, 6C illustrates how the configuration of reflections 40 illustrated in FIG. 5B can move relative to a pupil 36 and iris 34 of the eye 30 when the eye moves;

FIG. 7 illustrates re-orientation of content displayed by the second apparatus 10_2 in dependence upon at a group of reflections 40_2 in the eye 30 from the second apparatus 10_2;

FIGS. 8A and 8B illustrate a transfer of content portion 60A from being displayed at the apparatus 10_1 to being displayed at the apparatus 10_2, with absolute orientation maintained;

FIG. 9 illustrates a development of the method illustrated in FIG. 1;

FIG. 10 illustrates an example of an apparatus 10_1 suitable for performing the method of FIG. 9;

FIGS. 11A and 11B illustrate how images captured within the visible spectrum of light and within the infrared spectrum of light can differ, and allow improved reflection detection;

FIGS. 12A, 12B, 12C illustrate the obscuration of second content 60_2 displayed by the second apparatus 10_2 by the apparatus 10_1 and the re-sizing and re-positioning of the content to prevent obscuration of the second content 60_2;

FIG. 13 illustrates an example of a controller;

FIG. 14 illustrates an example of a computer program on a carrier.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

In the following description a class (or set) can be referenced using a reference number without a subscript index (e.g. 10) and a specific instance of the class (member of the set) can be referenced using the reference number with a numerical type subscript index (e.g. 10_1) and a non-specific instance of the class (member of the set) can be referenced using the reference number with a variable type subscript index (e.g. 10_i).

The following FIGS. illustrates various example of methods comprising:

capturing at least an image 21;

processing a sub-portion 21A of the image 21 to identify a plurality of reflections 40 in a human eye 30;

associating at least a second group of reflections 40_2 to a second apparatus 10_2;

controlling rendering of content 60 on at least the second apparatus 10_2 in dependence upon at least the second group of reflections 40_2.

The second group of reflections 40_2 associated to the second apparatus 10_2 encode information about a visibility of the second apparatus 10_2 to the human eye 30 and/or a position of the second apparatus 10_2 relative to the human eye 30 and/or an orientation of the second apparatus 10_2 relative to the human eye 30. The second group of reflections 40_2 can therefore be used to control rendering of content 60 on the second apparatus 10_2. This allows the content to be appropriate to the visibility and/or position and/or orientation of the second apparatus 10_2 relative to the human eye 30.

In this document an image 21 can be a single stand-alone image, a sequence of images or an image from a sequence of images (e.g. video). Although the methods are described as being used in respect of an image 21, they can be performed using multiple images. The multiple images can be captured sequentially from a single camera, in parallel from multiple cameras of the apparatus 10_1 or both sequentially and in parallel from multiple cameras of the apparatus 10_1.

In at least some examples, the capturing of the image 21; the processing of a sub-portion 21A of the image 21 to identify a plurality of reflections 40 in a human eye 30; the associating of a second group of reflections 40_2 to a second apparatus 10_2; and the controlling rendering of content 60 on at least the second apparatus 10_2 in dependence upon at least the second group of reflections 40_2 all occur, automatically, within a threshold period of time. The threshold can be adjusted to change a lag between the control of rendering of content 60 on the second apparatus 10_2. These operations can for example occur in 'real-time' (a lag of no more than a few seconds), contemporaneously (a lag of no more than 0.5 seconds) or simultaneously (a lag of less than 0.5 seconds).

In at least some examples, the capturing of the image 21; the processing of a sub-portion 21A of the image 21 to identify a plurality of reflections 40 in a human eye 30; the associating of a second group of reflections 40_2 to a second apparatus 10_2 all occur, automatically, within the threshold period of time. The controlling of rendering of content 60 on at least the second apparatus 10_2 in dependence upon at least the second group of reflections 40_2 can then be delayed, for example it may require a further trigger event such as a user input.

The following FIGS. also illustrate various examples of an apparatus 10_1 comprising: a camera 20 for capturing at least an image 21;
- means 22 for processing a sub-portion 21A of the image 21 to identify a plurality of reflections 40 in a human eye 30;
- means 22 for associating at least one second group of reflections 40_2 to a second apparatus 10_2;
- means 22, 24 for controlling rendering of content 60 on at least the second apparatus 10_2 in dependence upon at least the second group of reflections 40_2.

FIG. 1 illustrates an example method 100 comprising:
- at block 102 capturing at least an image 21;
- at block 104, processing a sub-portion 21A of the image 21 to identify a plurality of reflections 40 in a human eye 30;
- at block 106, associating at least a second group of reflections 40_2 to a second apparatus 10_2;
- at block 108, controlling rendering of content 60 on at least the second apparatus 10_2 in dependence upon at least the second group of reflections 40_2.

The method 100 is performed by an apparatus 10_1. The apparatus 10_1 controls rendering of content 60 at the second apparatus 10_2. Block 202, at the second apparatus 10_2 illustrates rendering of content 60 at the second apparatus 10_2 in dependence upon at least the second group of reflections 40_2, under control of the apparatus 10_1.

Figure 2:
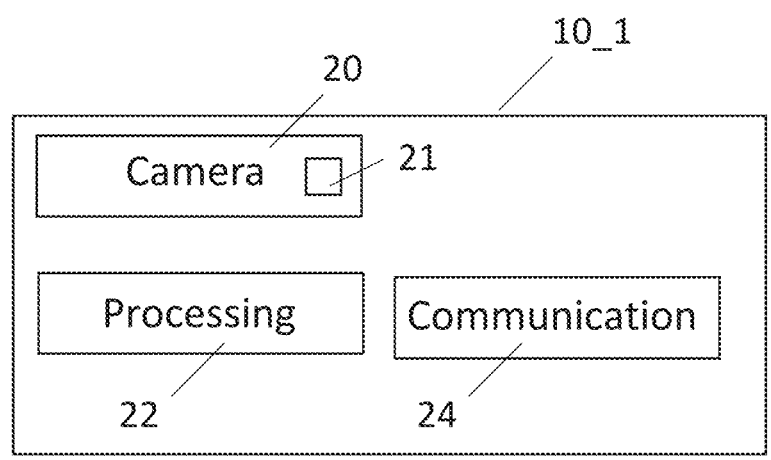
FIG. 2 illustrates an example of the apparatus 10_1.

In the example illustrated in FIG. 2, the apparatus 10_1 comprises a camera 20, processing circuitry 22 and radio communication circuitry 24.

The camera 20 is configured to capture an image 21. The camera 20 can be a single camera or a plurality of cameras. In at least some examples, the camera (or cameras) 20 are configured to capture light in the visible electromagnetic spectrum to form an image 21. In at least some examples, a camera (or cameras) 20 are configured to capture infrared (IR) light in addition to or instead of light in the visible electromagnetic spectrum to form an image 21. In at least some examples, a camera (or cameras) 20 are forward-facing. In at least some examples, a camera (or cameras) 20 are backward-facing.

The processing circuitry 22 is configured to process a sub-portion 21A of the image 21 to identify a plurality of reflections 40 in a human eye 30.

The processing circuitry 22 is configured to associate at least one second group of reflections 40_2 to a second apparatus 10_2.

The processing circuitry 22 is configured to control the communication circuitry 24 to send a communication (which may be directly or indirectly sent) to the second apparatus 10_2 to control the rendering of content 60 on the second apparatus 10_2.

In some examples, the processing circuitry can be provided by one or more controllers 400 (not labelled in this FIG., see FIG. 13).

The control of rendering of content 60 on the second apparatus 10_2 is consequently in dependence upon at least the second group of reflections 40_2.

The radio communication circuitry 24 can be any suitable radio communication circuitry. It can, for example, use a direct communication technology in the Industrial Scientific Medical (ISM) band of 2.4 Ghz, for example Bluetooth™, WiFi direct etc. It can, for example, use an access point to communicate such as a node of a mobile cellular communications network or an access point of a wireless local area network.

The apparatus 10_1 can, for example be any suitable apparatus. In some examples it is a mobile apparatus such as a hand-held mobile apparatus.

In some examples, the camera 20 is a front-facing cameras.

In some examples the apparatus 10_1 is a hand-held, mobile apparatus comprising a front display and a front camera 20.

Figure 3A:
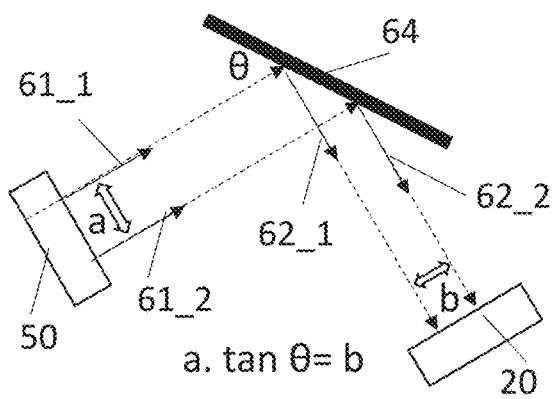
FIGS. 3A and 3B illustrate examples of reflection, with FIG. 3B illustrating reflection of light rays 61 from a human eye 40.
Figure 3B:
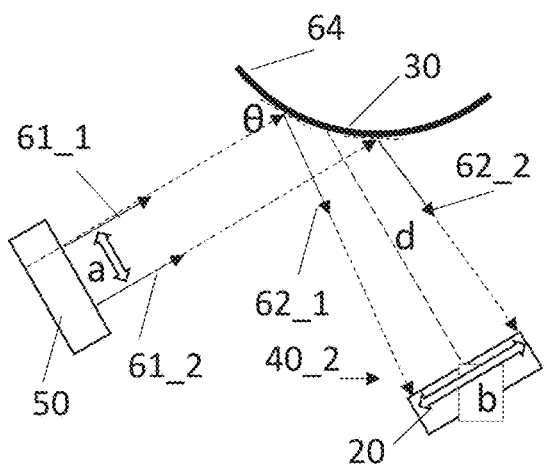

In FIGS. 3A and 3B, light rays 61 provided by an apparatus 10 are reflected by a reflection surface 64. The reflected light rays 62 are captured at a camera 20 of the first apparatus 10_1. In FIG. 3A the reflection surface 64 is a flat surface that reflects light specularly. In FIG. 3B, the reflection surface 64 (e.g. a human eye 30) is a non-flat surface that does not specularly reflect light. In this example the reflection surface has a convex curved reflection surface 64 and is representative of a reflection surface provided by a cornea of a human eye.

In these examples, the light rays 61 are provided by an apparatus 50. In these examples, the apparatus 50 is the second apparatus 10_2 but they could be provided by any apparatus including the first apparatus 10_1.

The group of original light rays 61 originating from the second apparatus 10_2 can have an original relative spatial arrangement or distribution that forms an original pattern. This original pattern is reflected by the reflection surface as a reflected pattern. The group of reflected light rays 62 have, at the camera 20 of the apparatus 10_1, a relative spatial arrangement or distribution defined by the reflection pattern. There is a causal relationship between the original pattern, the reflection surface 64 and the reflection pattern.

If the original pattern is produced from a display of the apparatus 50 (e.g. the second apparatus 10_2), then the original pattern is original second content 60_2 displayed by the display and the reflection pattern is the captured image of that original second content 60_2 after reflection in the reflection surface 64.

The original light pattern (original content) can be indicated to the apparatus 10_1, for example by the apparatus 50

(e.g. the second apparatus 10_2), or by another route. Alternatively, of in addition, the original light pattern (original content) can be controlled by the apparatus 10_1. FIG. 1 illustrates an optional communication 120 between the apparatus 10_1 and the second apparatus 10_2 used to achieve these functions.

The light rays 61 (and the reflected light rays 62) can be any suitable frequency of light. For example, the light rays 61, 62 can have a frequency within the visible electromagnetic spectrum. Alternatively or additionally, the light rays 61, 62 can have a frequency outside the visible electromagnetic spectrum (430 THz-750 THz), for example, within the infrared spectrum (300 GHz-430 THz), for example within the near infrared spectrum (214-430 THz)

In this example, the group of reflected light rays 62, which originated from the second apparatus 10_2 as light rays 61, is a group of reflections 40_2 comprised in a plurality of reflections from the reflection surface 64. The group of reflections 40_2 originated from the second apparatus 10_2.

The associating of a second group of reflections 40_2 to a second apparatus 10_2 can be achieved by associating the second group of reflections 40_2 to the original light pattern (e.g. original content) provided by the second apparatus, as lights rays 61.

The original light pattern (e.g. original content) is transformed by the reflection surface 64.

In FIG. 3A, the reflection surface 64 is flat and the transformation is a linear transformation—parallel light rays 61 before reflection remain parallel light rays 62 after. For example, a pair of parallel light rays 61_1, 61_2 separated by a distance 'a', on reflection become parallel light rays 62_1, 62_2 separated by a distance b. There is a linear relationship between a and b based on the angle θ of the reflection surface 64 relative to the incident light rays 61_1, 61_2.

In FIG. 3B, the reflection surface 64 is not flat and the transformation is a non-linear transformation-parallel light rays 61 before reflection do not remain parallel after. In this example, the convex reflection surface 64 causes divergence of the reflected light rays 62. For example, a pair of parallel light rays 61_1, 61_2 separated by a distance 'a', on reflection become diverging light rays 62_1, 62_2 separated by a distance b that increases in size with a distance 'd' from the reflection surface 64.

It will therefore be appreciated that there exists a transformation T that maps the original light pattern (e.g. original content) to the reflected light pattern (e.g. reflected content) that is captured by the camera 20 of the apparatus 10_1. This transformation provides information about a position (orientation and location) of the apparatus 50 (e.g. the second apparatus 10_2) relative to the human eye 30 and information about a position (orientation and location) of the first apparatus 10_1 relative to the human eye 30. At least some of this information can be obtained by identifying differences between the original light pattern (e.g. original content) and the reflected light pattern (e.g. reflected content) and/or by tracking changes in differences between the original light pattern (e.g. original content) and the reflected light pattern (e.g. reflected content) over time.

For example, differences between the original light pattern (e.g. original content) and the reflected light pattern (e.g. reflected content) provide information concerning the location of the second apparatus 10_2 and the apparatus 10_1 relative to the eye 30.

For example, differences over time between the original light pattern (e.g. original content) and the reflected light pattern (e.g. reflected content) provide information concerning movement of the eye (assuming, or detecting non-movement of the second apparatus 10_2 and the first apparatus 10_1).

It should also be appreciated that a spatial arrangement of different apparatus 10 producing an original light pattern (e.g. original content) creates a collective light pattern (e.g. a partially arranged collection of original content).

The apparatus 10_1 can then associate groups of reflections 40_i to a collection of apparatus 50_i, where each group of reflections 40_i originated from a respective one of the apparatuses 50_i.

In some examples, the apparatus 10_1 is configured to control rendering of content 60 on one of the collection of apparatuses (the second apparatus 10_2) in dependence upon the collective light pattern comprising multiple different groups of reflections 40_i originated from different originated from different apparatuses 50_i.

The collective pattern includes the second group of reflections 40_2 as well as one or more other groups of reflections 40_i associated with other apparatuses 50_i.

In some examples, the apparatus 10_1 is configured to control rendering of content 60 on the collection of apparatuses (including the second apparatus 10_2) in dependence upon at least the second group of reflections 40_2. Thus in some examples, the second apparatus 10_2 can be a system comprising a collection of apparatuses 10. This collection can for example include the apparatus 10_1.

Figure 4:
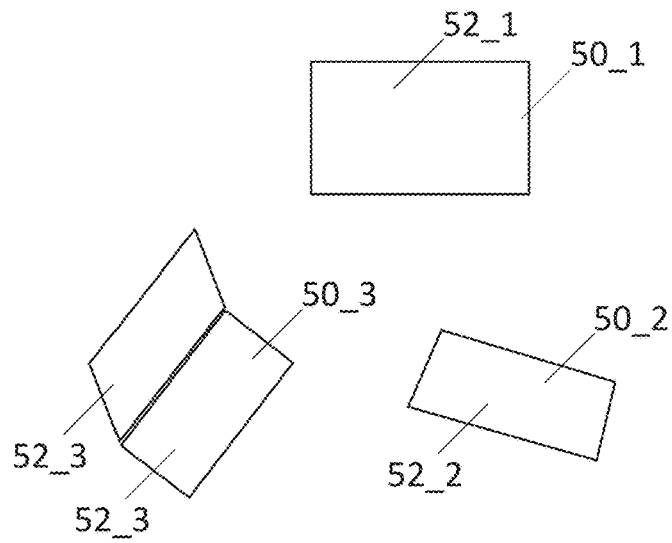
FIG. 4 illustrates an example of a configuration of example apparatuses 50 with example displays 52.

FIG. 4 illustrates an example of a spatial arrangement of different apparatuses 50. The apparatuses 50 operate as 'light beacons'.

This functionality has been previous described with reference to FIG. 3B. The apparatuses 50_i provide lights rays 61 that will be reflected by a reflection surface 64 of a human eye 30 to provide reflected light rays 62 that are captured by the camera 20 as reflections 40_i. The reflections 40_i are illustrated in FIGS. 5B and 6A to 6B.

In this example, it should be appreciated that the apparatuses 50 are more than dumb 'light beacons' such as display monitors. The apparatuses 50 comprise displays 52, user input interfaces and processing circuitry, and are capable of independent operation. In this document, an apparatus that is capable of independent operation is referred to as a device. The apparatus 10_1, the second apparatus 10_2 and the apparatuses 50 can be devices.

The apparatus 50_1 is a tablet (or laptop) computer with a display 52_1. The apparatus 50_2 is a mobile telephone (or pocket-sized computer) with a display 52_2. The apparatus 50_3 is a foldable computer with two displays 52_3. Any one of the apparatuses 50_1, 50_2, 50_3 can be the second apparatus 10_2. The spatial collection of the apparatuses 50_1, 50_2, 50_3 can be the second apparatus 10_2.

In this example, the displays 52 of the apparatuses 50 are used as light beacons.

In the following it will be assumed that the original light pattern (e.g. original content) created by the displays 52 of the apparatuses 50 is a bright white light. This is merely for the purposes of ease of illustration. Any suitable original light pattern (e.g. original content) can be created by the displays 52 of the apparatuses 50. The original light pattern (e.g. original content) of each apparatus 50 can be different.

The apparatus 10_1 which could be one of the apparatuses 50 (or a different apparatus) can then associate groups of reflections 40_1, 40_2, 40_2 to a collection of the apparatuses 50_1, 50_2, 50_3 or individually to the apparatuses 50_1, 50_2, 50_3.

The content displayed by the display 52_1 of the apparatus 50_1 creates the group of reflections 40_1. This is, in this example, a reflection of the white display 52_1 which is upright relative to a desk (not labelled). The content displayed by the display 52_2 of the apparatus 50_2 creates the group of reflections 40_2. This is, in this example, a reflection of the white display 52_2 which is flat relative to the desk (not labelled). The content displayed by the display 52_3 of the apparatus 50_1 creates the group of reflections 40_3. This is, in this example, a reflection of the white displays 52_3—one of which is flat relative to the desk and one of which is at an angle to the desk.

FIG. 5A illustrates an example of an image 21 captured by the camera 20 of the apparatus 10_1.

The image includes an image of a human 2. The human may be an active user of the apparatus 10_1, for example the user 2 may be carrying, holding or using the apparatus 10_1. The humans 2 has two eyes.

The apparatus 10_1 can perform the processing described in relation to only one eye 30, or can perform the processing described in relation to both eyes 30.

For example, the apparatus 10_1 can comprise:

means for processing a first sub-portion of the image 21 to identify a first plurality of reflections in a first eye 30 of a human 2;

means for associating at least a second group of the first plurality of reflections to a second apparatus 10_2;

means for processing a second sub-portion of the image 21 to identify a second plurality of reflections in a second eye 30 of a human 2;

means for associating at least a second group of the second plurality of reflections to the second apparatus 10_2; and controlling rendering of second content on at least the second apparatus 10_2 in dependence upon at least the second group of the first plurality of reflections and the second group of the second plurality of reflections.

The first sub-portion of the image 21 images the first eye 30 and includes a group of reflections in the first eye that are associated with the second apparatus 10_2, for example, reflections of light rays originating from the second apparatus 10_2.

The second sub-portion of the image 21 images the second eye 30 and includes a group of reflections in the second eye that are associated with the second apparatus 10_2, for example, reflections of light rays originating from the second apparatus 10_2.

The rendering of second content on at least the second apparatus 10_2 is controlled in dependence upon at least the group of reflections in the first eye associated with the second apparatus 10_2 and the group of reflections in the second eye associated with the second apparatus 10_2.

FIG. 5B illustrates an example of a sub-portion 21A of an image 21 captured by the camera 20 of the apparatus 10_1. In this example, the sub-portion 21A is a sub-portion of the image 21 illustrated in FIG. 5A.

The sub-portion 21A includes an image of an eye 30 of the human 2. The eye 30 has different parts including: a pupil 36 that provides a light aperture into the eye 30, an iris 34 that controls a size of that aperture, and a cornea 32 which is a convex curved protective layer that covers the iris and pupil and forms the exterior part of the eye 30. The cornea 32 can provide a partially reflective surface 64 (not labelled in FIG. 5B) but previously labelled in FIG. 3B.

FIG. 5B illustrates a group of reflection 40_1 created by the display 52_1 of the apparatus 50_1, a group of reflection 40_2 created by the display 52_2 of the apparatus 50_2, and a group of reflections 40_2 created by the displays 52_3 of the apparatus 50_3.

It can be appreciated from FIG. 3B that the reflections 40 change as the position of the second apparatus 10_2 changes relative to the eye 30. The group of reflections 40 created by the second apparatus 10_2 change in a predictable manner as the location and/or orientation of the second apparatus 10_2 changes relative to the eye 30. It is therefore possible to measure this change to determine the location and/or orientation of the second apparatus 10_2 relative to the eye 30. The change measured can be an absolute change relative to the original light pattern (e.g. content) produced by the second apparatus 10_2 and/or can be a relative change over time, that is, how the group of reflections 40 created by the second apparatus 10_2 changes over time.

It can be appreciated from FIGS. 6A, 6B, 6C that the reflections 40 change as the position of the eye changes relative to the second apparatus 10_2. The group of reflections 40 created by the second apparatus change in a predictable manner as the orientation of the eye 30 changes.

FIG. 6A illustrates a group of reflections 40 created by the second apparatus 10_2 when the human/user 2 is looking straight ahead.

FIG. 6B illustrates how the group of reflections 40 created by the second apparatus 10_2 moves relative to the components of the eye (pupil 36, iris 34) when the human/user 2 is looking up. The group of reflections 40 created by the second apparatus 10_2 moves down when the human/user 2 is looking up.

FIG. 6C illustrates how the group of reflections 40 created by the second apparatus 10_2 moves relative to the components of the eye (pupil 36, iris 34) when the human/user 2 is looking down. The group of reflections 40 created by the second apparatus 10_2 moves up when the human/user 2 is looking down.

Thus, group of reflections 40 created by the second apparatus 10_2 move in a direction relative to the components of the eye (pupil 36, iris 34) that is opposite to a change in a direction of gaze of the human/user 2.

Thus, the apparatus 10_1 can, in at least some examples, be configured to process the images 21 to track movement of the group of reflections 40 created by the second apparatus 10_2 to determine a change in direction of gaze of the human/user 2.

The apparatus 10_1 can therefore be configured to process an image to identify a human eye and define the sub-portion of the image comprising the human eye 30. The apparatus 10_1 can therefore be configured to process an image to identify components of a human eye 30 and track movement of reflections relative to those components. Computer vision analysis can be used to achieve these tasks.

A group of reflections 40 created by the second apparatus 10_2 can be analysed, by processing the captured image 21, to determine a relative orientation between the second apparatus 10_2 and the human/user 2.

For example, knowledge of a shape of a display used by the second apparatus 10_2 or knowledge of what content is being displayed by the second apparatus enables the first apparatus 10_1 to determine an orientation of the apparatus. The first apparatus 10_1 can then control the second apparatus 10_2 so that content displayed by the second apparatus 10_2 is modified so that it appears properly oriented to the human/user 2.

For example, the first apparatus 10_1 can determine what rotation within the display of the second apparatus 10_2 will align a content-defined vertical direction with a vertical direction defined by the first apparatus 10_1. The first apparatus 10_1 can then control the second apparatus 10_2 so that content displayed by the second apparatus 10_2 is rotated so it appears properly oriented to the human 2.

The apparatus 10_1 is, for example, configured to control at least content orientation at the second apparatus 10_2 relative to an orientation of the human eye 30 in dependence upon at least the second group of reflections 40_2.

The apparatus 10_1 is, in some examples, configured to control an orientation of all of the second content 60_2 displayed at the second apparatus 10_2, relative to an orientation of the human eye 30, in dependence upon at least the second group of reflections 40_2. The apparatus 10_1 is, in some examples, configured to control an orientation of a portion 60A of the second content displayed at the second apparatus 10_2, relative to an orientation of the human eye 30, in dependence upon at least the second group of reflections 40_2.

The apparatus 10_1 is, for example, configured to control at least an orientation of content displayed at the second apparatus 10_2 relative to an orientation of the apparatus 10_1.

Where the human 2 is a user of the apparatus 10_1, then orientation of the human eye the orientation of the apparatus 10_1 can be the same.

The second apparatus 10_2 can, in some examples, re-size the rotated content so that it fits within the display of the second apparatus 10_2.

FIG. 7 illustrates an example, in which the content 60 displayed by the second apparatus 10_2 is rotated so that a content-defined vertical 72 is aligned (parallel with) a vertical 70 for the user 2 of the first apparatus 10_1.

The apparatus 10_1 is therefor configured to control rendering of content 60 on the second apparatus 10_2 in dependence upon at least the second group of reflections 40_2 by controlling at least content orientation at the second device relative to a user of the apparatus 10_1.

FIGS. 8A and 8B, illustrate an example where the apparatus 10_1 is configured to simultaneously control rendering of first content 60_1 on a display 52_1 of the apparatus 50_1 and rendering of second content 60_2 on a display 52_2 of the apparatus 50_2, in dependence upon at least the second group of reflections 40 that have been associated to the second apparatus 10_2.

In this example, the apparatus 10_1 is the apparatus 50_1 and the second apparatus 10_2 is the apparatus 50_2. In other examples, the apparatus 10_1 is the apparatus 50_2 and the second apparatus 10_2 is the apparatus 50_1.

In this example, the apparatus 50_1 is configured to transfer a content portion 60A from the display 52_1 of the apparatus 50_1 (FIG. 8A) to the display 52_2 of the apparatus 50_2 (FIG. 8B). In some examples, the content portion 60A is the whole of the first content 60_1 rendered on the display 52_1 of the apparatus 50_1.

In FIG. 8A, before transfer, the apparatus 50_1 displays in display 52_1 first content 60_1 comprising a first content portion 60A and a second content portion 60B. The first content portion 60A is transferred and the second content portion 60B is not transferred. In FIG. 8B, after transfer, the apparatus 50_1 displays in display 52_1 first content 60_1 comprising at least the second content portion 60B.

In some examples, it can continue to display the first content portion 60A, however, in this example the first content portion 60A has been replaced with different content 60C.

In FIG. 8A, before transfer, the display 52_2 of the apparatus 50_2 displays second content 60_2. This content does not comprise the first content portion 60A. In FIG. 8B, the display 52_2 of the apparatus 50_2 displays second content 60_2 and at least a portion of the displayed content comprises the transferred first content portion 60A. The first content portion 60A can be oriented, relative to the display 52_2 of the apparatus 50_2 in which it is displayed so that its absolute orientation remains the same, for example it maintains the same orientation relative to the apparatus 50_1.

In at least some examples, the apparatus 10_1 controls the transfer automatically without a requirement for any user input. In at least some examples, the apparatus 10_1 controls the transfer semi-automatically with a requirement for user input. For example, the apparatus 10_1 controls the display 52_1 of the apparatus 10_1 to present, for example display, a user selectable option to transfer content (e.g. first content portion 60A) from the display 52_1 of the apparatus 10_1 to the display 52_2 of the second apparatus 10_2.

In the example illustrated in FIG. 8B, the first content portion 60A transferred from the display 52_1 of the apparatus 10_1 to the display 52_2 is replaced, in the display 52_1 with different content 60C. In this example, the transferred content portion 60A is replaced with a simplified representation 60C of the transferred first content 60_1 now displayed on the display 52_1 of the apparatus 10_1. The simplified representation 60C can for example be an icon or other indicator.

In at least some examples, the transfer of content from the display 52_1 of the apparatus 50_1 to the display 52_2 of the second apparatus 50_2 can occur differently.

In some examples, the content is split into a left portion and a right portion and the left portion is rendered on one of the apparatuses 50_1, 50_2 and the right portion is rendered on the other one of the apparatuses 50_1, 50_2.

In some examples, the content is split into a foreground portion and a background portion and the foreground portion is rendered on one of the apparatuses 50_1, 50_2 and the background portion is rendered on the other one of the apparatuses 50_1, 50_2.

In some examples, the content is split by content type e.g. MIME content type. One type of content is preferentially rendered on one of the apparatuses 50_1, 50_2 and another type of content is preferentially rendered on the other one of the apparatuses 50_1, 50_2. In some but not all examples, text content is rendered on a high-contrast, grey-scale, side-lit display and image content is rendered on a high resolution, color, back-lit or emissive display.

FIG. 9 illustrates an example method 100 comprising:
- at block 102 capturing at least an image 21;
- at block 104, processing a sub-portion 21A of the image 21 to identify a plurality of reflections 40 in a human eye 30;
- at block 106, associating at least a second group of reflections 40_2 to a second apparatus 10_2;
- at block 108, controlling rendering of content 60 on at least the second apparatus 10_2 in dependence upon at least the second group of reflections 40_2;
- at block 105, associating at least a first group of reflections 40_2 to a first apparatus 10_1;
- at block 110, controlling rendering of content 60 on at least the first apparatus 10_1 in dependence upon at least the first group of reflections 40_1.

In some examples, the method is performed by an apparatus different to the first apparatus 10_1 and the second apparatus 10_2. In other examples, the method is performed by the first apparatus 10_1.

The first group of reflections 40_1 associated to the first apparatus 10_1 encode information about a visibility and/or a position and/or an orientation of the first apparatus 10_2 relative to the human 2 and can therefore be used to control rendering of content 60 on the first apparatus 10_1, and optionally on the second apparatus 10_2. This allows the content to be appropriate to the visibility and/or position and/or orientation of the first apparatus 10_1

The second group of reflections 40_2 associated to the second apparatus 10_2 encode information about a visibility and/or a position and/or an orientation of the second apparatus 10_2 relative to the human 2 and can therefore be used to control rendering of content 60 on the second apparatus 10_2. This allows the content to be appropriate to the visibility and/or position and/or orientation of the second apparatus 10_2.

The method illustrated is an extension of the previous methods described. Features described with respect to previous methods are also relevant to this method.

Referring to FIG. 10, in the example illustrated, the apparatus 10_1 comprises a camera 20, processing circuitry 22, a display 52_1 and radio communication circuitry 24.

The camera 20 has previously been described with reference to FIG. 2.

The radio communication circuitry 24 has been previously described with reference to FIG. 2.

In this example, the processing circuitry 22 is configured to associate a first group of reflections 40_1 to content displayed by the display 52_1 of the apparatus 10_1.

The processing circuitry 22 is configured to control rendering of first content on the first apparatus 10_1 in dependence upon the first group of reflections 40_2.

The processing circuitry 22 is configured to control the communication circuitry 24 to send a communication (which may be directly or indirectly sent) to the second apparatus 10_2 to control the rendering of content 60 on the second apparatus 10_2.

The control of rendering of content 60 on the second apparatus 10_2 is consequently in dependence upon at least the second group of reflections 40_2.

As previously mentioned the content 60 displayed in a display 52 that is to be reflected by the eye 30 towards the first apparatus 10_1, can provide visible content and/or infrared content. It can be easier for the apparatus 10_1 to process an image to identify reflections when the image is an infrared light image rather than a visible light image. For example, as illustrated in FIGS. 11A and 11B, an infrared image 21 (FIG. 11B) has higher visibility (e.g. brightness) than a visual image (FIG. 11A).

FIG. 11A illustrates an example of how a display 52 of the apparatus 50 displaying visible light content would appear to a visible light sensor in the camera 20. There is a low brightness in the visible spectrum. Information content portion 60A is displayed in display 52 with background content portion 60B. The background content portion 60B is black in the visible spectrum (no visible content).

FIG. 11B illustrates an example of how a display 52 of the apparatus 50 displaying infrared light content would appear to an infrared (IR) light sensor in the camera 20. There is a higher brightness in the IR spectrum. Information content portion 60A is displayed in display 52 with background content portion 60B. The background content portion 60B which is black in the visible spectrum (no visible content) is white in the IR spectrum (bright, full spectrum IR content).

As previously mentioned the content 60 displayed in a display 52 that is to be reflected by the eye 30 towards the first apparatus 10_1, can provide visible content and/or infrared content. It can be easier for the apparatus 10_1 to process an image to identify reflections when the image is an infrared light image (FIG. 11B) rather than a visible light image (FIG. 11A).

An original light pattern (original content) in the visible spectrum can be less easily processed than an original light pattern (original content) in the infrared spectrum In at least some examples, the display 52_1 of the second apparatus 10_2 is configured to produce content in the visible spectrum and/or the infrared spectrum (or near infra red spectrum). An original light pattern (original content) in the visible spectrum can be less easily processed than an original light pattern (original content) in the infrared spectrum Obscuration of one apparatus from another can also be determined by the analysis of reflection in an eye. For example, the light pattern (original second content 60_2) displayed by a second apparatus 10_2 can be partially obscured by another apparatus. This obscuration may be more obvious in the infrared spectrum. An example of obscuration is illustrated in FIGS. 12A and 12B. FIG. 12A illustrates a captured image of content 60 that has been reflected from an eye of a human 2 without obscuration by another apparatus or object. FIG. 12B illustrates a captured image of content 60 that has been reflected from an eye of a human 2 with obscuration, before reflection, by another apparatus or object. FIG. 12C illustrates a captured image of content 60 that has been reflected from an eye of a human 2 where the content 60 has been re-sized or otherwise modified at the apparatus 10_2 (under control of the apparatus 10_1 as previously described) so as not to be obscured.

A rear camera on an apparatus can be used to confirm obscuration by one apparatus of another apparatus.

In the above paragraphs reference has been made to the functionality of an apparatus 10_1 and a second apparatus 10_2. It should however be appreciated that a single apparatus can at different times operate as the apparatus 10_1 and at different times operates as the apparatus 10_2.

For example, the apparatus 10 can comprise means for entering the apparatus into at least a 'master' mode or a 'slave' mode.

In the master mode, the apparatus 10 operates as apparatus 10_1 and is configured to control rendering of second content on at least the second apparatus 10_2 in dependence upon at least the second group of reflections.

In the slave mode, the apparatus 10 operates as second apparatus 10_2 and is configured to render second content on its display 52 in dependence on control from a different apparatus operating as the first apparatus 10_1.

The apparatuses 50 can be configured to communicate with each other to determine which apparatus 50 operates as the first apparatus 10_1 and which one or more other apparatus 50 operate as the second apparatus 10_2. In at least some examples, the determination is based at least on: mobility of the apparatus 50, current orientation relative to the human eye 30, current distance from the human eye 30, whether or not obscured.

The following use cases emphasize content distribution between devices that are visible to a user, thus giving the user a distributed content experience. There is parallel rendering of content on multiple mobile devices, when the user has multiple mobile devices in view. A user consuming content on a mobile device can benefit from the display capabilities of devices, particularly other mobile devices. The position and orientation of multiple devices relative to where the user is looking, can be detected.

The primary mobile device 10_1 detects the secondary devices 10_2 within the imminent field of view (FOV) of the user 2 based on capturing images 21 from the cornea 32 of an eye 30 and detecting cornea reflections 40 of the device screens 52_2. Cornea reflection can be a reflection of the visible, and near infrared (NIR) or infrared (IR), wavelengths of the spectrum of the light emitted by the screens 52 of the devices 10_2. Furthermore, the primary device 10_1 controls the optimization of the content rendering on all displays, and the distributed content experience for all devices.

Distributed content rendering by detecting an orientation of other mobile devices 10_2 in the user's imminent FOV and ensuring the orientation of the content is aligned with the user 2.

Use Case

The user 2 is browsing content 60 on her mobile device (primary device) 10_1, and has other devices 50 (secondary devices 10_2) nearby, see FIG. 4. The primary device 10_1 is paired with the secondary devices 10_2. The user 2 has enabled distributed content experience in his/her multi-device ecosystem.

When the distributed content experience mode is enabled, the primary device 10_1 detects the pose of the user's head by using the front camera 20 of the device 10_1 and head pose detection algorithms. In addition, the primary device 10_1 can track the eyes 30 of the user 2, and capture the reflections 40 of light from the cornea 32 of the user 2.

The content sharing may be automatic or user controlled. Furthermore, the content sharing may be to share the screen estate to a larger area (i.e., extend screen) and/or sharing content to different screens based on content types, e.g., keeping text and images on separate screens.

Use case: Secondary device display screen orientation based on a reflection of visible spectrum of light.

In this embodiment, the distributed content experience mode is implemented so that the displays 52 of the devices 50 (secondary devices 10_2) are on. In this case, the red (R), green (G), blue (B) pixels of the display 52 emit some light when the user 2 is browsing content 60 with her primary device 10_1. The front camera 20 of the primary device 10_1 detects the reflections 40 of the secondary device screens 52 from the cornea 32. Object detection algorithms estimate the orientation of the displays 52 based on the reflections 40, and some initial information about the devices 50 that has been shared between the primary device 10_1 and secondary devices 50, 10_2 when the devices were paired. Initial information may include, e.g., the secondary device 10_2 model and details about the displays of the devices.

The radius of eye cornea is typically quite similar between individuals, and calculating distances of the devices from the eye(s) while knowing their screen sizes is possible. However, detecting cornea reflections from both eyes simultaneously can further increase the accuracy of device positioning, as this gives a stereo view to the device constellation. Calculating distances between the devices and user/eyes based on this stereo view is more accurate.

When the distributed content experience mode is enabled and the orientation of the secondary devices 10_2 is known, primary device 10_1 can take control over the display 52 of the secondary device 10_2. As an example, primary device 10_1 can send portion 60A of the first content 60 on the primary device 10_1 to the display 52 of the secondary device 10_2. This allows showing one portion 60B of the first content 60_1 on the display 52_1 of the primary device 10_1, and a simplified representation 60C of another portion 60A of the first content 60_1 on the display 52_1 of the primary device 10_1. The simplified representation 60C can be e.g., small indicator or a thumbnail. An extended and more detailed representation of the simplified representation of the content can be rendered on the display 52_2 of the secondary device 10_2. Now that the orientation of the display 52_2 of the secondary device 10_2 to the user 2 is known, the rendering of the extended content on the display 52_2 of the secondary device 10_2 can be optimized for best viewing experience.

In one example implementation, the primary device 10_1 may indicate which elements would be suitable for distributed use (e.g., based on the detected screen size and content type) and the user 2 may then be in control of what will be shown in distributed manner.

In the case that the orientation changes in one or more of the devices, the content may be adapted to the new display orientation.

Use case: Secondary device screen orientation based on a reflection of combined visible and (N)IR spectrum of light In this embodiment, some of the pixels of a display of the second device 10_2 can emit near infrared (NIR) or infrared (IR) light which the mobile device 10_1 can detect. Such (N)IR pixels can be used together with R, G, B pixels, or alone when the R, G, B pixels of the mobile device are entirely off. When the R, G, B pixels of the mobile device are entirely off, the (N)IR pixel illumination can be implemented e.g., as a part of the mobile device always-on display (AoD) feature, which allows the device screen to share some information while the device itself is asleep or inactive. In this case, for the user the display 52 of the secondary device 10_2 would look like being partially or entirely off, but the camera 20 of the primary device 10_1 would see the reflection of the (N)IR light from the cornea 32 of the user 2. The main benefit of using (N)IR illumination is to be able to detect the screen reflections on the cornea 32 in a robust way, no matter of the visual content being displayed to the user (e.g. a black screen). A secondary benefit is related to the increased contrast of the cornea reflection, as the eye media efficiently absorbs (N)IR light and the pupil appears as a very dark background to the reflection (i.e., no retinal reflection of (N)IR through the pupil).

FIG. 11A shows how the user would perceive the content when the content distributed mode is used in a NIR enhanced device. FIG. 11B illustrates how the NIR enhanced view would be seen by a mobile device rear camera.

In another example, the primary device 10_1 is on the Line of Sight (LoS) of the user 2 and occludes part of the display 52 of the secondary device 10_2 (FIG. 12B). Content rendering can be optimized to avoid occlusions, and how the user would perceive the content in that case (FIG. 12C).

Optionally, the emitted (N)IR light can be used as part of a gaze tracking solution. For example, the (N)IR sensitive camera of the primary device can track 1. the pupil(s) of the eye(s) and 2. the cornea reflections of the (N)IR light sources. Based on the detected relative positions of these, the gaze direction (optical or visual axis of the eye) compared to the primary device can be calculated. The use of secondary devices increases the spread of the (N)IR light sources and thus improve the gaze tracking accuracy.

Use Case: Improved Occlusion Detection

In this embodiment the primary mobile device 10_1 may use both rear and front camera of the primary device simultaneously to improve the detection of occlusions. In this case the occlusion detection would be based on the analysis of the features of the cornea reflection and the features of the rear camera captured image. Only partial display areas of devices are used when occlusions occur. This may significantly improve the user experience in multi-device rendering.

FIG. 13 illustrates an example of a controller 400 suitable for use in an apparatus 10_1. Implementation of a controller 400 may be as controller circuitry. The controller 400 may be implemented in hardware alone, have certain aspects in software including firmware alone or can be a combination of hardware and software (including firmware).

As illustrated in FIG. 13 the controller 400 may be implemented using instructions that enable hardware functionality, for example, by using executable instructions of a computer program 406 in a general-purpose or special-purpose processor 402 that may be stored on a computer readable storage medium (disk, memory etc.) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 10_1 when loaded into the processor 402. The computer program instructions, of the computer program 406, provide the logic and routines that enables the apparatus to perform the methods illustrated in the accompanying FIGS. The processor 402 by reading the memory 404 is able to load and execute the computer program 406.

The apparatus 10_1 comprises:
at least one processor 402; and
at least one memory 404 including computer program code
the at least one memory 404 and the computer program code configured to, with the at least one processor 402, cause the apparatus 10_1 at least to perform:
processing a sub-portion of a captured image to identify a plurality of reflections in a human eye;
associating at least one second group of reflections to a second apparatus;
controlling rendering of second content on at least the second apparatus in dependence upon at least the second group of reflections.

The apparatus 10_1 comprises:
at least one processor 402; and
at least one memory 404 including computer program code,
the at least one memory storing instructions that, when executed by the at least one processor 402, cause the apparatus at least to:
processing a sub-portion of a captured image to identify a plurality of reflections in a human eye;
associating at least one second group of reflections to a second apparatus;
controlling rendering of second content on at least the second apparatus in dependence upon at least the second group of reflections.

As illustrated in FIG. 14, the computer program 406 may arrive at the apparatus 10_1 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 10_1 may propagate or transmit the computer program 406 as a computer data signal.

Computer program instructions for causing an apparatus to perform at least the following or for performing at least the following:
processing a sub-portion of a captured image to identify a plurality of reflections in a human eye;
associating at least one second group of reflections to a second apparatus;
controlling rendering of second content on at least the second apparatus in dependence upon at least the second group of reflections.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory or memories that work together to cause an apparatus, such as a mobile phone or server, to perform various functions and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying FIGS. may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The apparatus 10_1 can be a module.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A first apparatus comprising:
a camera for capturing at least an image;
a first display;
at least one processor; and
at least one memory storing instructions that, when executed by the at least one processor, cause the apparatus at least to:
process a sub-portion of the image to identify a plurality of reflections in a human eye;
associate at least one second group of reflections of the plurality of reflections with a second apparatus, wherein the at least one second group of reflections originated from a second display of the second apparatus; and
control rendering of first content on the first display and second content on the second display of the second apparatus in dependence upon at least the second group of reflections.

2. The first apparatus as claimed in claim 1, wherein controlling rendering of second content on at least the second apparatus in dependence upon at least the second group of reflections is configured to control at least content orientation at the second apparatus relative to the human eye in dependence upon at least the second group of reflections.

3. The first apparatus as claimed in claim 1, wherein associating at least one second group of reflections to a second apparatus is configured to associate the at least one second group of reflections to a light pattern provided by the second apparatus, wherein the light pattern is indicated to the first apparatus or the second content is controlled by the first apparatus.

4. The first apparatus as claimed in claim 1, wherein associating at least one second group of reflections to a second apparatus is configured to associate the at least one second group of reflections to the second content displayed by the display of the second apparatus, wherein the second content is indicated to the first apparatus or the second content is controlled by the first apparatus.

5. The first apparatus as claimed in claim 1, wherein the apparatus is further caused to associate a first group of the plurality of reflections to the first apparatus; and
control rendering of second content on the second display and first content on the first display, in dependence upon at least the first group of the plurality of reflections.

6. The first apparatus as claimed in claim 5, wherein associating the at least one first group of reflections to the first apparatus is configured to:
associate the at least one first group of reflections to a light pattern provided by the first apparatus; or
associate the at least one first group of reflections to first content displayed by the first display of the first apparatus.

7. The first apparatus as claimed in claim 1, wherein the first apparatus is further caused to simultaneously control rendering of first content on the first display of the first apparatus and rendering of the second content on the second display of the second apparatus, in dependence upon at least the second group of reflections.

8. The first apparatus as claimed in claim 1, wherein the first apparatus is further caused to:
automatically transfer a content portion from the first display of the first apparatus to the second display of the second apparatus; or
present a user selectable option to transfer a content portion from the first display of the first apparatus to the second display of the second apparatus.

9. The first apparatus as claimed in claim 8, wherein the first apparatus is further caused to replace the content transferred, in the first display of the first apparatus, with a simplified representation of the content transferred.

10. The first apparatus as claimed in claim 1, wherein controlling rendering of second content on the second display of the second apparatus in dependence upon at least the second group of reflections is configured to control at least an orientation of second content displayed on the second display of the second apparatus relative to an orientation of the second apparatus.

11. The first apparatus as claimed in claim 1, wherein the first apparatus is further caused to:
process a first sub-portion of the image to identify a first plurality of reflections in a first eye of the human;
associate at least one second group of the first plurality of reflections to the second apparatus;
process a second sub-portion of the image to identify a plurality of reflections in a second eye of the human;
associate at least one second group of the second plurality of reflections to the second apparatus; and
control rendering of second content on at least the second apparatus in dependence upon at least the second group of the first plurality of reflections and the second group of the first plurality of reflections.

12. The first apparatus as claimed in claim 1, configured to operate in at least a master mode or a slave mode, wherein
when the first apparatus is in the master mode, the first apparatus is configured to control rendering of the second content on at least the second apparatus in dependence upon at least the second group of reflections; and
when the first apparatus is in the slave mode, the first apparatus is configured to render content on the first display of the first apparatus in dependence upon control from a different apparatus.

13. The first apparatus as claimed in claim 1, configured as a hand-held, mobile apparatus comprising a front display and a front camera.

14. A method comprising:
- processing, by a first apparatus, a sub-portion of a captured image to identify a plurality of reflections in a human eye;
- associating at least one second group of reflections of the plurality of reflections to a second apparatus, wherein the at least one second group of reflections originated from a display of the second apparatus; and
- controlling rendering of first content on a display of the first apparatus and second content on the display of the second apparatus in dependence upon at least the second group of reflections.

15. A method as claimed in claim 14, wherein controlling rendering of second content on at least the second apparatus in dependence upon at least the second group of reflections is configured to control at least content orientation at the second apparatus relative to the human eye in dependence upon at least the second group of reflections.

16. A method as claimed in claim 14, wherein associating at least one second group of reflections to a second apparatus is configured to associate the at least one second group of reflections to a light pattern provided by the second apparatus, wherein the light pattern is indicated to the first apparatus or the second content is controlled by the apparatus.

17. A method as claimed in claim 14, wherein associating at least one second group of reflections to the second apparatus is configured to associate the at least one second group of reflections to the second content displayed by the display of the second apparatus, wherein the second content is indicated to the first apparatus or the second content is controlled by the first apparatus.

18. A method as claimed in claim 14, further comprising associating a first group of the plurality of reflections to the first apparatus; and
- controlling rendering of second content on the second apparatus and first content on the first apparatus, in dependence upon at least the first group of the plurality of reflections.

19. A method as claimed in claim 18, wherein associating the at least one first group of reflections to the first apparatus further comprises:
- associating the at least one first group of reflections to a light pattern provided by the first apparatus; or
- associating the at least one first group of reflections to first content displayed by a display of the first apparatus.

20. A non-transitory computer readable medium comprising program instructions stored thereon for performing at least the following:
- processing a sub-portion of a captured image to identify a plurality of reflections in a human eye;
- associating at least one second group of reflections of the plurality of reflections to a display device of a second apparatus, wherein the at least one second group of reflections originated from the display device of the second apparatus; and
- controlling rendering of first content on a display device of a first apparatus and second content on the display device of the second apparatus in dependence upon at least the second group of reflections.

* * * * *